United States Patent [19]

Hill

[11] Patent Number: 4,906,313
[45] Date of Patent: Mar. 6, 1990

[54] FUSION WELD METHOD AND ASSEMBLY FOR FORMING A FUSION WELDED JOINT BETWEEN PIPE SECTIONS

[75] Inventor: Donald C. Hill, Pasadena, Calif.

[73] Assignee: R. W. Lyall & Company, Inc., Santa Fe Springs, Calif.

[21] Appl. No.: 191,557

[22] Filed: May 9, 1988

[51] Int. Cl.[4] .................... B29C 65/34; H05B 3/44
[52] U.S. Cl. ....................... 156/158; 156/274.2; 156/304.3; 156/294; 219/535; 219/541; 219/544; 285/21
[58] Field of Search ............... 156/158, 273.9, 274.2, 156/304.2, 304.3, 304.6, 294, 379.7, 503, 423; 219/541, 544, 535; 285/21

[56] References Cited

U.S. PATENT DOCUMENTS

| | | | |
|---|---|---|---|
| 2,739,829 | 3/1956 | Pedlow et al. | 219/544 |
| 3,062,940 | 11/1962 | Bauer et al. | |
| 3,094,452 | 6/1963 | Von Riegen et al. | 156/274.2 |
| 3,235,289 | 2/1966 | Jones | 285/21 |
| 3,422,179 | 1/1969 | Bauer et al. | 285/21 |
| 3,506,519 | 4/1970 | Blumenkranz | 156/273.9 |
| 3,943,334 | 3/1976 | Sturm | 219/544 |
| 4,117,311 | 9/1978 | Sturm | 156/379.7 |
| 4,147,926 | 4/1979 | Stahli | 219/544 |
| 4,176,274 | 11/1970 | Lippera | 219/544 |
| 4,224,505 | 9/1980 | Sturm | 219/544 |
| 4,313,053 | 1/1982 | Sturm | 219/544 |
| 4,362,684 | 12/1982 | Thalmann | 156/304.2 |
| 4,493,985 | 1/1985 | Keller | 219/535 |
| 4,530,520 | 7/1985 | Nyffeler et al. | 219/544 |
| 4,530,521 | 7/1985 | Nyffeler | 219/544 |
| 4,634,844 | 1/1987 | Lodder et al. | 219/544 |
| 4,718,698 | 1/1988 | Hill | 285/21 |

FOREIGN PATENT DOCUMENTS 1440713  2/1959  United Kingdom .

Primary Examiner—Michael Wityshyn
Attorney, Agent, or Firm—Fulwider, Patton, Lee & Utecht

[57] ABSTRACT

A fusion weld method and assembly for forming a fusion welded joint between abutting pipe sections having the same exterior diameter and having a predetermined melting temperature. The assembly includes an extruded welding collar having an interior surface fabricated to closely receive the inserted pipe sections. A welding sleeve comprising a pair of spaced apart sections is received within collar recesses dimensioned to place the sleeve in flush relationship with the collar interior and immediately adjacent the pipe sections. The welding sleeve sections are located on opposite sides of the pipe ends to isolate the pipe ends from their heating effect, and the connecting lead between the sections is recessed for the same reason. The close fit of the collar and sleeve sections with the pipe sections enables development of internal bonding pressures sufficient to constrain the wire turns of the sleeve sections against thermal drift, and to produce a fusion bond of adequate depth and continuity.

11 Claims, 3 Drawing Sheets

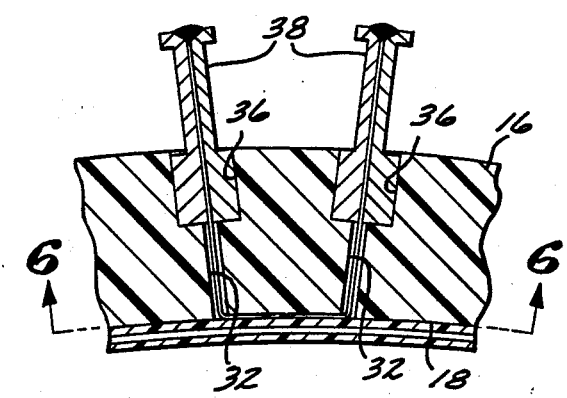
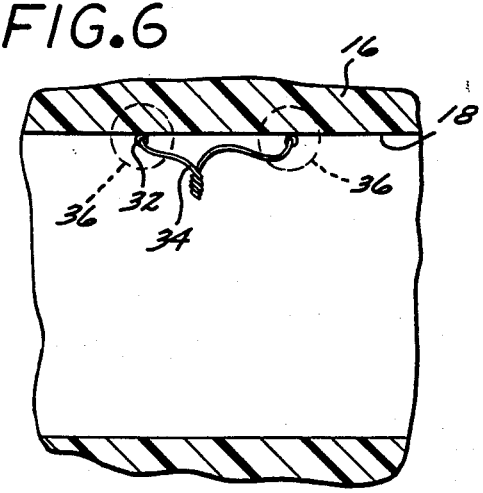
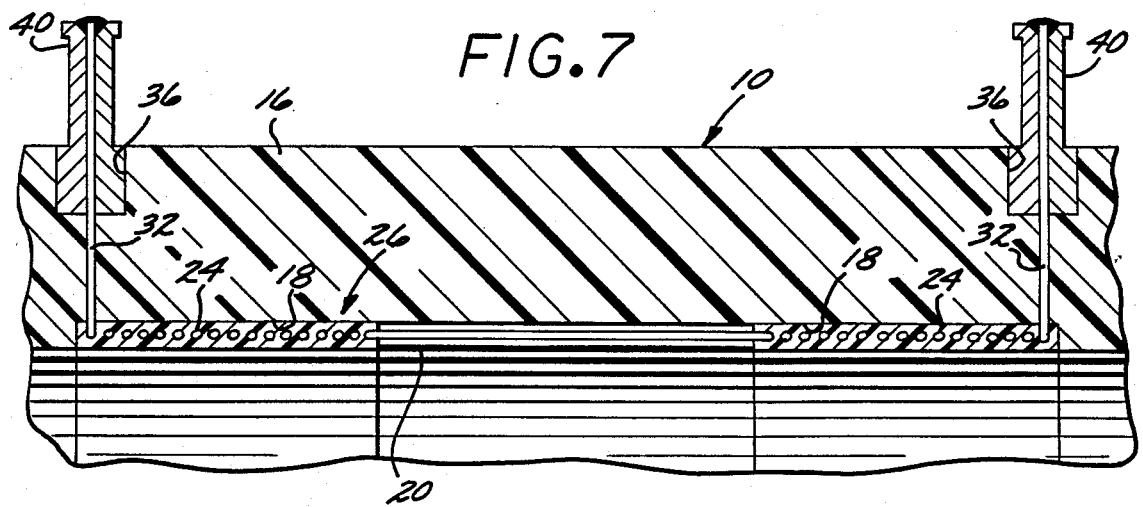
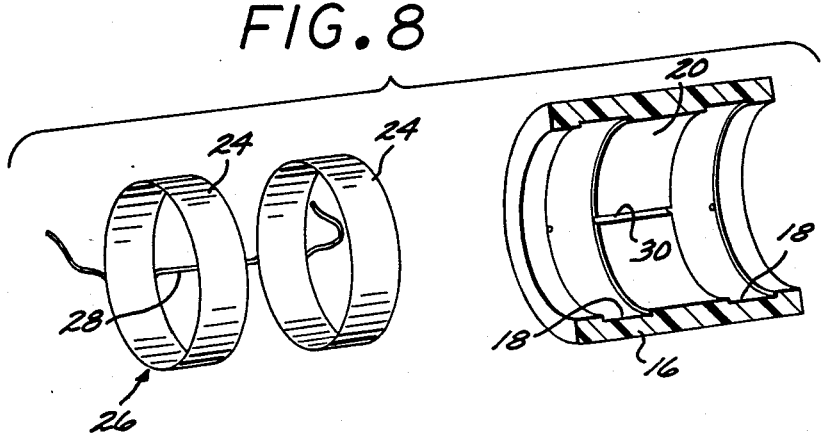

FUSION WELD METHOD AND ASSEMBLY FOR FORMING A FUSION WELDED JOINT BETWEEN PIPE SECTIONS

TECHNICAL FIELD

The present invention relates to a fusion weld method and assembly for forming a fusion welded butt joint between thermoplastic pipe sections.

BACKGROUND ART

Pipelines made of medium to high density polyethylene or similar thermoplastic material are commonly used for transporting fluids such as natural gas. In making a buried pipe installation heat can be applied directly to the pipe ends by a suitable heating rod, and the pipe ends then pressed together to fuse the melted thermoplastic material and form a butt joint. However, once the installation is completed, replacement of a damaged pipe section is more difficult since the replacement pipe must be butted up tight against the adjacent undamaged sections. There is insufficient clearance between the pipe ends to insert a heating rod, and normally it is not possible to move the pipe sections relative to the surrounding earth.

In such instances a thermoplastic coupling or welding collar has been employed which receives the pipe sections within its opposite ends. The collar incorporates a helical heating coil or welding sleeve formed by continuous wraps or turns of wire sheathed in thermoplastic material and arranged along the inner surface of the collar in regular, longitudinally spaced apart relation. Energization of the welding sleeve raises the temperature of the interface between the welding sleeve and the abutting pipe sections to a molten state and forms a fusion bond. However, such a fusion welded joint has a number of significant shortcomings.

More particularly, when the interface between the welding sleeve and the pipe sections is heated to a molten state, the helical turns of the welding sleeve tend to float in the molten material. If they are not stabilized, such as by compressing them between the collar and pipe sections, some turns drift closer together and heat concentrates in that area, with correspondingly lower levels of heat in other areas where the turns are spaced farther apart. The areas of higher temperature tend to occur at the butt joint interface, and the thermoplastic material in that area approaches a molten state much more quickly than the remainder of the interface. As heating is continued in order to raise the remainder of the interface to fusion temperature, the thermoplastic material at the butt joint loses its structural rigidity and the pipe ends sag radially inwardly and intrude into the pipe flow passage. As melted material flows into the sag area, the heating coil turns migrate to that area and even closer together, compounding the sagging problem and accelerating the flow of molten material toward the butt joint area. By the time the interface throughout the complete length of the collar has reached proper fusion temperature the sagging adjacent the butt joint has created "hot spots" where the pipe walls are burned and structurally weakened.

The thermal sagging of the pipe ends is worsened if the pipe ends are irregularly cut. Since dimensional discrepancies or gaps can be as much as one eighth of an inch, the thermoplastic material flowing into these voids can rob the parent pipe of enough material that the pipe walls adjacent the joint are structurally deficient.

Sagging of the fused plastic into the pipe interior at the pipe ends not only adversely affects fluid flow, but the presence of sagged material at that point means there is probably insufficient fused material present along the remainder of the interface to provide a continuous bond. Also, any discontinuity in the bond results in gas leakage.

Attempts in the prior art to prevent radial inward sagging of the plastic material at the pipe ends have not been completely successful. U.S. Pat. No. 4,718,698, issued Jan. 12, 1988, for "Apparatus & Method of Forming Fusion Welded Butt Joint Between Thermoplastic Pipe Sections", and assigned to the assignee of the present application, teaches the use of a pair of flanged inner sleeves made of thermoplastic material. These were fitted within the pipe sections before placement of the welding collar over the exterior of the pipe sections. The sleeve flanges were abutted so that their melting and fusing would fill any dimensional discrepancies between the abutting pipe ends. The remainder of the sleeves did not melt but instead provided support against radial inward thermal sagging of the pipe ends. This generally solved the problem of sagging adjacent the butt joint, but at the expense of unwanted complexity and cost.

Another attempt in the prior art to solve "hot spot" heating adjacent the butt joint involved placement of two separately energizable heating coils in the welding collar on opposite sides of the butt joint. This method tended to isolate the pipe ends from excessive heating, but it was a relatively expensive expedient involving a multiplicity of electrical terminals and associated wiring. Further, it did not solve the problems of dimensional discrepancies between the welding collar and the pipe sections. Such discrepancies made it difficult to develop the necessary bonding pressures to stabilize the heating coil turns against thermal drift, to form a fusion interface layer of adequate length and continuity, and to eliminate gas inclusions such as air bubbles.

Such dimensional discrepancies result in large part from the fact that prior art welding collars are typically molded, and relief of the internal molding stresses on cooling changes the dimensions of such a collar so that it is often out of round. The resulting absence of intimate contact with the exterior surfaces of the pipe sections reduced bonding pressures and allowed air to be drawn into the bond interface during fusion heating, which adversely affected the depth and continuity of the fusion layer. U.S. Pat. No. 3,506,519, issued Jan. 13, 1916 for "Method of Making Interlocked Welded Connections Between Thermoplastic Articles", attempted to solve the lack of proper bonding pressures by employing an external pressure strap encircling the weld area. It was tightened to apply external pressure to the joint. However, the strap was not completely effective in collapsing the inner, partially softened bond area of the collar because it had to act through the relatively unsoftened, structurally rigid outer portion of the collar. As a consequence, the strap did not adequately maintain the welding sleeve in intimate contact with the articles to be joined, and did not develop the pressure necessary to stabilize the heating coil turns against drifting in the molten thermoplastic material.

Accordingly, there has been a need for a means to form a thermally fused circumferentially continuous leak free joint between pipe sections made of thermoplastic material, while preserving the structural integrity of the pipe sections without affecting fluid flow through the pipes.

DISCLOSURE OF THE INVENTION

The present invention provides an improved fusion weld method and assembly for forming a fusion welded butt joint between thermoplastic pipe sections. The assembly includes an open-ended cylindrical welding collar for receiving the pipe sections within its opposite ends. The pipe ends abut along a transverse abutment plane. A welding sleeve integral with the collar is heated by passage of electrical current to fuse the thermoplastic material of the collar and pipe sections which define the joint interface. On cooling, the collar and pipe sections are bonded together by the fused material.

The collar is not molded as were prior art collars, but is extruded to provide a close dimensional match with the exterior pipe surfaces. It is thereafter heat treated or tempered to relieve internal stresses, and this is followed by machining of the interior surface of the collar further to insure a precision interface with the pipe sections to be joined. The extruded collar is absent the planes of structural weakness often present at the parting or mold lines of molded welding collars.

The heating or welding sleeve comprises a pair of sleeve sections received in complemental longitudinally spaced apart recesses formed in the interior surface of the welding collar. The collar material between the recesses defines a thermal barrier land. The connecting lead which electrically connects the sleeve sections is recessed within a groove formed in the land, out of possible engagement with the pipe sections.

The welding sleeves are each constituted of turns of electrical resistance wire sheathed in thermoplastic material. The contiguous portions of the adjacent wire turns are fused together so that the sleeve sections are each unitary or self supporting. This facilitates insertion of the sleeve sections into the collar recesses. The dimensions of the sleeve sections are made so that they fit closely within the recesses, essentially flush with the interior surface of the welding collar.

The welding sleeve sections are preferably thermally tacked or bonded in the welding collar recesses so that they are not unseated upon insertion of the pipe sections. This is done by first inserting a mandrel having an outer diameter approximating the inner diameter of the collar, and thereafter heating the welding sleeve to heat the wire turns and partially fuse the thermoplastic material of the wire turns to the walls of the collar recesses.

In practicing the method of the invention, the pipe sections are disposed within the opposite ends of the collar in close fitting relation, with their ends in abutment along the transverse abutment plane. This occurs approximately midway between the welding sleeve section recesses and the collar so that the thermal barrier land slows heat flow from the recesses toward the abutting pipe ends.

Terminal means are provided in the collar for electrical connection to the free ends of the pair of welding sleeve sections, respectively. Electrical current is then passed through the terminal means to the welding sleeve to bring to fusion temperature the thermoplastic material defining the interfaces between the welding sleeve, the collar and the pipe sections. The heating is not imparted to the abutting pipe ends, instead being concentrated within the circumferential interfaces between the welding sleeve sections and the pipe sections. Because the pipe ends are thus not subjected to fusion temperature heating, they do not experience radial inward sagging during the bonding process.

The close and intimate contact provided between the welding sleeve and the pipe sections has been found to be an important feature in producing a fusion layer at the bond interface having the depth and circumferential continuity necessary for a leak free, structurally sound joint. It is theorized that the heated interior portion of the welding collar expands radially inwardly at a rate greater than the radial outward expansion of the less heated exterior portion of the collar at the same time the heated pipe sections are expanding radially outwardly. Once the close tolerance fit between the collar and the pipe sections is taken up, further expansion compresses the sleeve sections within the collar recess, which constrains the welding sleeve coils against axial or longitudinal movement. It also confines fusion of the thermoplastic material to the area adjacent the welding sleeve recesses, and melted material cannot escape to produce wall thinning hot spots or radial sagging of the pipe ends. This results in a fused interface layer that is relatively thick and circumferentially continuous.

Other objects and features of the invention will become apparent from the following more detailed description, taken in conjunction with the accompanying drawings, which illustrate by way of example the principles of the invention.

BRIEF DESCRIPTION OF DRAWINGS

FIG. 5 is an enlarged detail view taken along the line 5—5 of FIG. 1;

FIG. 6 is a view taken along the line 6—6 of FIG. 5;

FIG. 7 is an enlarged view taken along the line 7—7 of FIG. 2;

FIG. 8 is an exploded perspective view of the pair of sleeve sections constituting the welding sleeve and a half section of the welding collar within which they are received.

BEST MODES FOR CARRYING OUT THE INVENTION

Figure 1:
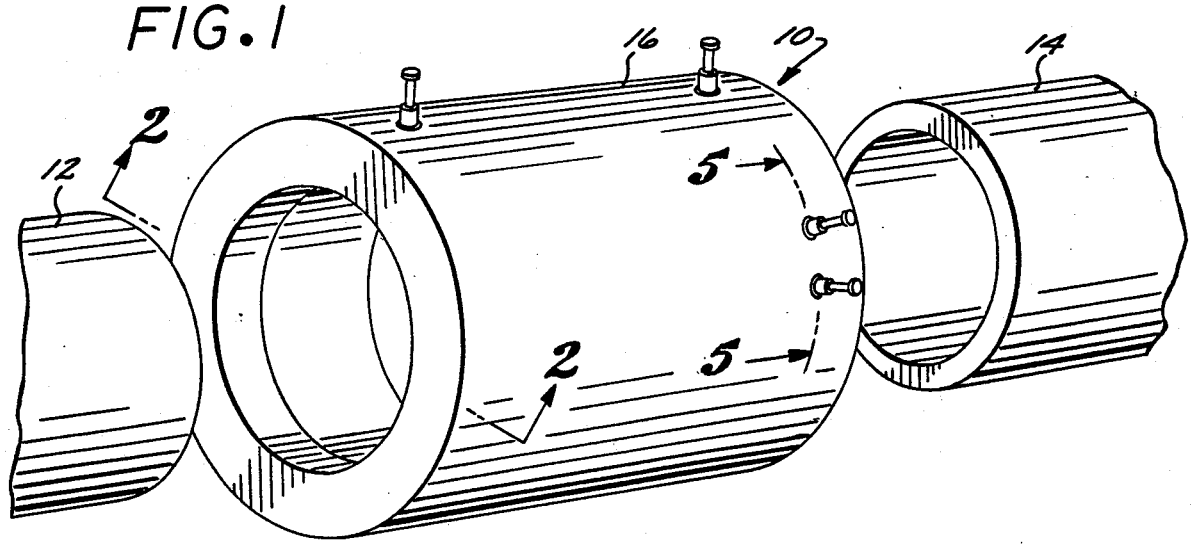
FIG. 1 is an exploded perspective view of a pair of pipe sections located adjacent the fusion welding assembly of the present invention.
Figure 2:
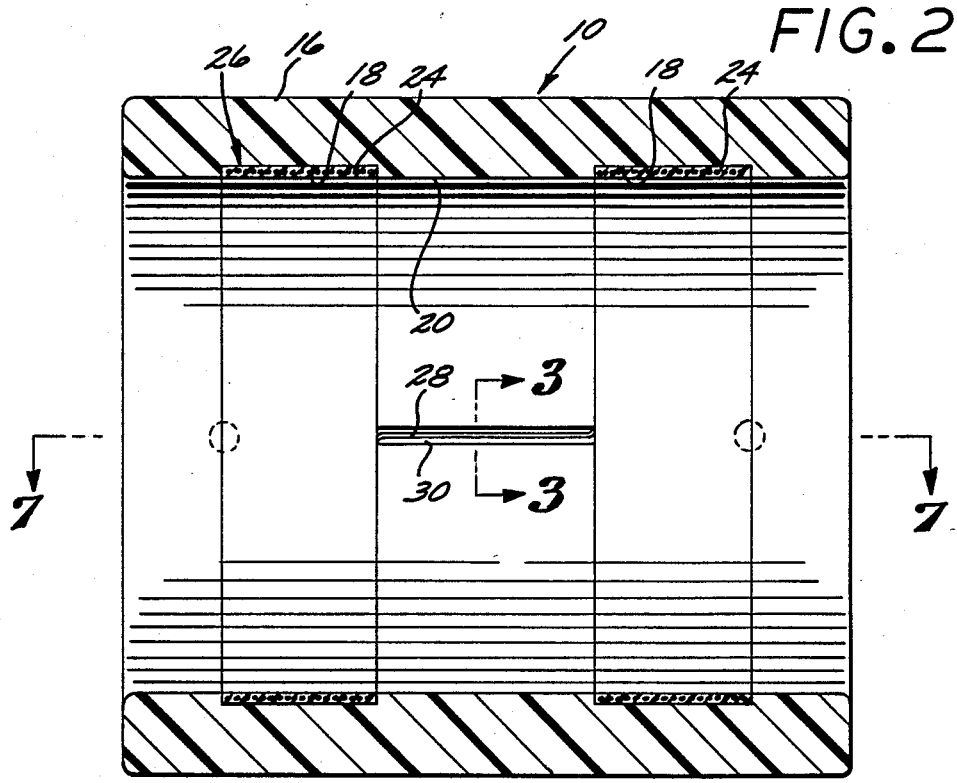
FIG. 2 is an enlarged view taken along the line 2—2 of FIG. 1.
Figure 3:
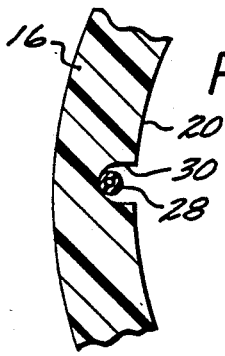
FIG. 3 is a partial sectional view taken along the line 3—3 of FIG. 2 and illustrating the connecting lead of the welding sleeve and the collar groove within which it is located.

Referring now to the drawings, a fusion weld assembly 10 is illustrated for forming a fusion welded butt joint between a pair of thermoplastic pipe sections 12 and 14. The sections have the same exterior diameter and are made of a thermoplastic material having a predetermined melting temperature. The thermoplastic material commonly used is a medium density polyethylene having a melting or fusion temperature of 265 degrees Fahrenheit.

The assembly 10 comprises, generally, an elongated cylindrical annular welding coupler or collar 16 made of thermoplastic material which is preferably the same material as that of the pipe sections 12 and 14, and characterized by a similar melting or fusion temperature.

Prior art welding collars are typically molded and are therefore characterized by molding or parting lines. These often constitute structurally weakened planes which limit the amount of internal pressure which can be developed without failure of the collar. As will be seen, the development of internal pressure is important to the formation of a good fusion bond between the collar and the pipe sections.

In addition, when molded collars are cooled, internal thermal stresses are relieved and the collars often cool out of round so that gaps or dimensional discrepancies occur between the inner surface of the collar and the outer surfaces of the pipe sections with which it is associated. Such dimensional discrepancies result in loss of bonding pressure, and paths of escape are provided for molten material. As previously indicated, this is productive of a host of problems, including irregular heating of the interface between the collar and pipe sections, so-called "hot spots" where the material of the components is structurally weakened and prone to failure under internal operating pressures, and interface areas t heated to fusion temperatures.

In contrast, the collar 16 is extruded of a plastic material like the material of the pipe sections, and having approximately the same melting or fusion temperature. It is preferably made with a wall thickness greater than that of the pipe sections to enable development of higher internal bonding pressures, as will be seen. The collar stock is typically extruded into 20 or 40 foot sections, which is then cut into 4 to 8 inch lengths to form the individual collars. The collars are stress relieved by heating in an oven at between 200 to 250 degrees Fahrenheit for approximately 24 hours.

The interior surface of the cooled collar is next precision machined to closely approximate the exterior diameter of the pipe sections. For example, the outside diameter of a 2 inch pipe sections measures approximately 2.375 inches, and the inside diameter of a mating collar would be machined to approximately 2.391 inches. In a coaxially arranged assembly of the collar and a pair of pipe sections, the clearance between their walls would be approximately 0.008 inches. This is just sufficient to allow the pipe sections to be inserted into the collar.

At the time the collar interior is machined, a pair of equal diameter internal annular welding sleeve recesses 18 are also machined into the collar interior surface. In longitudinal cross section each recess has a longitudinally directed base and opposite transverse side walls. The recesses are longitudinally spaced apart to define a thermal barrier land 20 between them.

Figure 9:
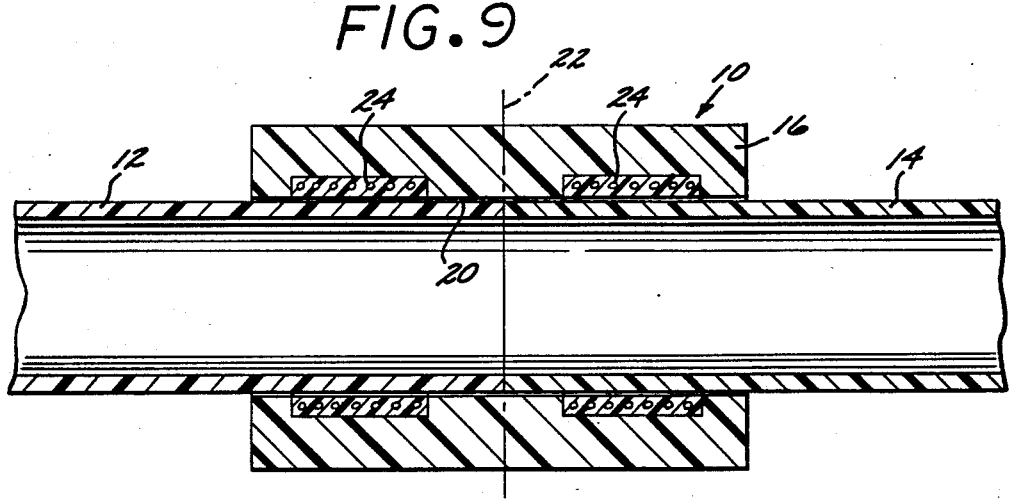
FIG. 9 is a longitudinal cross sectional view of the welding collar the pair of pipe sections received therein in abutting relation.

As best seen in FIG. 9, the pipe sections 12 and 14 are slidably receivable within the collar 16, with their ends in abutment along the transverse abutment plane indicated by the numeral 22. Preferably the pipe sections are arranged within the collar so that the abutment plane 22 falls approximately midway between the pair of recesses 18.

Figure 4:
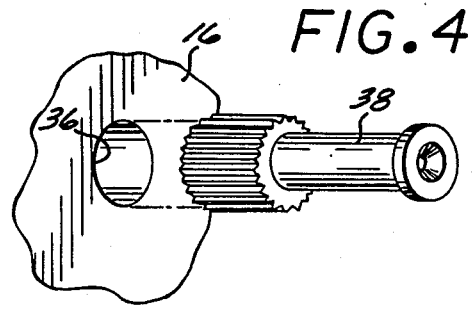
FIG. 4 is an exploded detail perspective view of a welding sleeve electrical terminal and the portion of the collar within which it is received.

The recesses 18 are dimensioned to closely receive an annular welding sleeve 26, and more particularly a pair of sleeve sections 24 which form the welding sleeve 26. Before insertion of the welding sleeve sections into the collar, a pair of adjacent radially directed thermocouple terminal seats 36 are drilled through the collar wall radially outwardly of one of the collar recesses. As best seen in FIG. 4., a pair of electrically conductive terminals 38, each having an axially extending wire passage therethrough and characterized by a larger diameter base having radially directed, axially extended teeth or ridges, is heated by any suitable means and pressed into the pair of seats 36, respectively. The diameter of the base of each terminal 38 is slightly larger than the diameter of a seat 36 so that the heated base will displace the softened material of the seat to provide a gas-tight fit with the base corrugations, the softened material partially filling the spaces between the corrugations.

The wire passage of each terminal 38 is then used to drill a wire opening through to the base of one of the collar recesses.

Thermocouple wire 34 is then disposed through each of the terminals 38 and through the openings 32. The inner ends of the wire are twisted together, as seen in FIG. 6, and pressed against the base of the collar recess. A heating iron is preferably utilized to heat the thermocouple wire to melt it flush with the base of the recess. This locates the thermocouple wire away from the turns of the welding sleeve wire approximately the radial thickness of the sheathing once the sleeve sections are inserted within the collar. The spacing may be, for example, approximately 0.025 inches, which corresponds with the spacing between the heating wire and the exterior surfaces of the pipe sections to be heated and gives a temperature reading accurately reflecting the bond interface temperature.

The free ends of the thermocouple wire are cut off at the ends of the terminals 38 and are soldered in position.

A similar procedure is followed to mount the welding sleeve terminals 40 used in energizing the welding sleeve. The seats for the terminal bases, the wire openings from the terminal bases through the collar, the heating of the terminals to seat them, and the construction of the terminals themselves, are identical to that just described in connection with the thermocouple wires and terminals. However, the terminals 40 are located adjacent the outer turns of the sleeve sections, respectively. Part of the end turn of each sleeve section is stripped of its plastic sheathing and inserted through the wire opening and central passage of the associated terminal 40. The free ends of the stripped wire are then cut off and soldered to the ends of the terminals.

The welding sleeve 26 is initially formed separately of the collar 16, each of the sleeve sections 24 comprising a plurality of turns of electrical resistance wire sheathed in thermoplastic material having a square or rectangular cross section. The adjacent turns of the sheathed wire are heating sufficiently to adhere or partially fuse them together so that the sections maintain their shape separately of the collar. The sleeve sections each have an outside diameter approximating that of the recesses so that the sleeve sections can be partially collapsed or radially deformed to fit past the lesser diameter interior surfaces of the collar for receipt within the larger diameter recesses. There the sleeves are closely received in substantially flush relation with the adjacent interior surfaces of the collar, and in intimate contact with the base and side walls of the associated collar recesses.

This intimate contact is facilitated by the square or rectangular cross section of the turns or coils of the welding sleeve.

The sleeve sections are electrically connected by a connecting lead 28 constituting a straightened or common portion of adjacent turns of the sleeve sections. The lead 28 is located within a groove 30 extends longitudinally through the land 20 and between the recesses 18. The groove depth is such that the lead 28 is spaced below or radially outwardly of the edge margins which define the groove. The connecting lead 28 is thus recessed out of possible engagement with the pipe sections so that the pipe ends adjacent the abutment plane 22 are not subjected to the heating effect of the connecting lead on energization of the welding sleeve 26. As previously indicated, the free ends of the sleeve sections are electrically coupled to the energizing terminals 40.

The sleeve sections are preferably tacked or lightly fused in position within the recesses so that they do not turn over upon one another or become otherwise entangled when the pipe sections are inserted into the collar. This is conveniently done by inserting a cylindrical metal mandrel into the collar after the sleeve sections are properly seated in the recess. The mandrel has an exterior diameter approximating that of the interior diameters of the seated sleeve sections and the interior surface of the collar, including the land 20. The welding sleeve is energized for approximately 5 to 8 seconds to heat the mandrel and partially fuse the thermoplastic material of the sleeve sections and the collar such that the sleeve sections form a smooth continuation of the inner surface of the collar. The mandrel is then withdrawn and the collar is ready for use.

The thermoplastic material of the collar, welding sleeve sections, and the inserted pipe sections defining the bond interface are arranged as shown in FIG. 9, and all are gradually raised to approximately 200 degrees Fahrenheit, which is below the melting or fusing point of approximately 265 degrees Fahrenheit for polyethylene. The temperature rise is achieved by passing electrical current through the wire of the welding sleeve to raise the temperature of the components at the bond interface.

The recessed location of the connecting lead 28, and the presence of the thermal barrier land 20, prevents appreciable heating of the abutting ends of the pipe sections so that fusion and radial inward sagging of the pipe ends is not possible. Instead, the heating effect of the energized welding sleeve is confined to the circumferentially extending heating zones or bands which define the bond interface, and which are constituted of the thermoplastic material of the sleeve sections and of the fraying surfaces of the collar and pipe sections.

Figure 10:
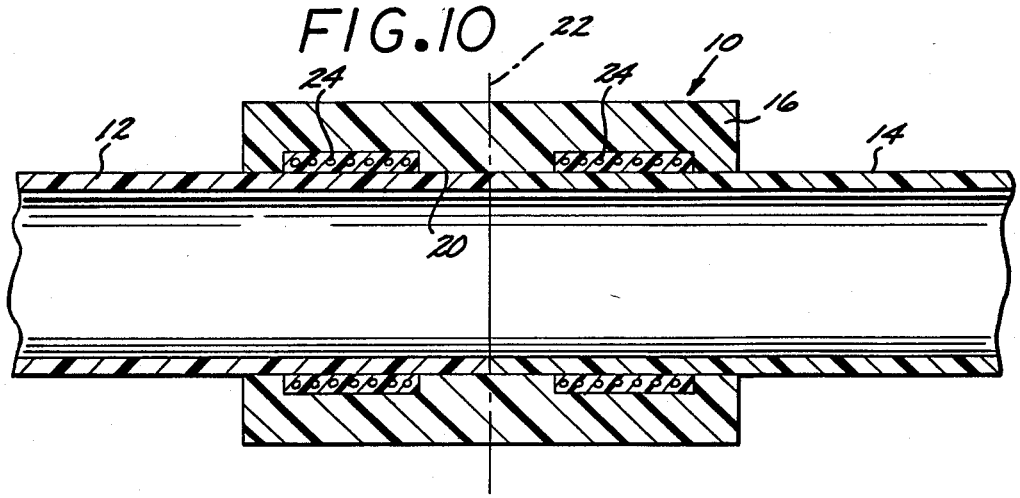
FIG. 10 is a view similar to FIG. 9 upon initial heating of the welding sleeve, and consequent expansion of the components to eliminate the clearance spaces which previously existed to permit insertion of the pipe sections.

The slow rise in the temperature of the interface radially outwardly expands the pipe sections, and inwardly expands the interior portion or layer of the collar at a rate greater than the rate of expansion of the radially outwardly located, relatively unheated portion of the collar. This phenomenon first closes the clearance between the collar and the pipe sections, as seen in FIG. 10.

Figure 11:
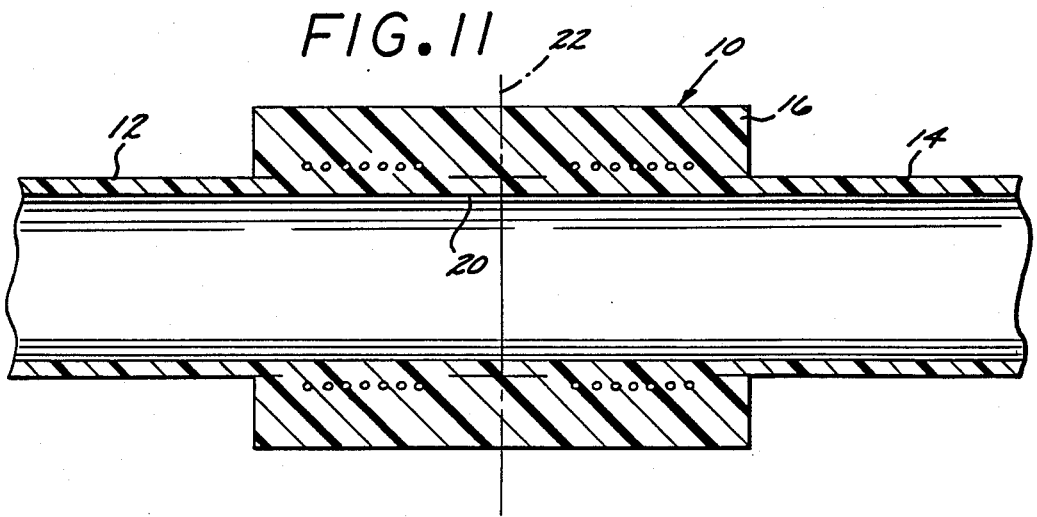
FIG. 11 is a view similar to FIG. 9, but illustrating the completed fusion welded joint.

Continued heating melts and fuses the thermoplastic sheath covering the welding sleeve wire, and also melts the adjacent portions of the collar and pipe sections so that the fused materials intermingle and integrate into a fused mass, as best seen in FIG. 11. However, fusion does not occur between the thermal barrier land 20 and the pipe sections.

During the heating and fusing just described, the pressure within the sleeve recesses increases significantly, forcing the sleeve sections into forcible engagement with the exterior surfaces of the pipe sections. This prevents melting material in the recesses from flowing away, so that the turns of the heating sleeve in the melted mass are constrained against movement toward or away from each other. With the turns effectively held in place, the current can now be increased to, for example, 22 amperes to rapidly complete the melting and fusion of material at the bond interface.

The confinement of the heated thermoplastic material in the sleeve recesses concentrates heat flow from the welding sleeve to the pair of bond bands or circumferential interfaces adjacent the recesses, which produces a circumferentially continuous pair of bond interfaces having a width approximating the length of each recess. The close fitting relation of the collar with the pipe sections also collapses and eliminates air bubbles in the fused material of the interface, all of which results in an improved depth of fusion at the bond interface and a strong, gas tight joint.

Thus, by employing an extruded collar, closely internally machined to match the exterior diameter of the pipe sections, circumferentially continuous bond interfaces can be produced between the collar and the pipe sections, and without any radially directed internal sagging of the material of the pipe ends. Fusion of the thermoplastic material in the interfaces adjacent the welding sleeve recesses provides a fusion layer of adequate depth and circumferential continuity, without any need for the externally developed compressive forces characteristic of a number of prior art systems.

Various modifications and changes may be made with regard to the foregoing detailed description without departing from the spirit of the invention.

I claim:

1. A fusion weld assembly for forming a fusion welded joint between pipe sections having the same exterior diameter and made of thermoplastic material, the fusion welding assembly comprising:

an extruded elongated annular collar made of thermoplastic material and having a machined interior surface with a diameter closely approximating the exterior diameter of the pipe sections whereby the pipe sections are closely coaxially receivable within the collar in close-fitting end abutting relation along a transverse abutment plane, the collar including a pair of internal annular recesses longitudinally spaced apart on opposite sides of the abutment plane to define an internal thermal barrier land having a groove, each of the recesses having the same interior diameter; and a welding sleeve including a pair of annular sleeve sections disposed in the pair of recesses, respectively, each sleeve section having a plurality of turns of electrical resistance wire sheathed in thermoplastic material and further having an outside diameter approximating the diameter of the recesses, the welding sleeve further including a connecting lead electrically connecting the pair of sleeve sections and comprising an electrical resistance wire sheathed in thermoplastic material located in the groove below the edge margins of the thermal barrier land defining the groove whereby the connecting lead is recessed out of possible engagement with the pipe sections, the thermoplastic material of the welding sleeve, the collar and the pipe sections being fusible at their interfaces at a predetermined melting temperature upon passage of electrical current through the wire and the connecting lead whereby the collar and the pipe sections are bonded together, the recessed location of the connecting lead and the presence of the thermal barrier land preventing fusing of the abutting ends of the pipe sections, the interior diameter of the sleeve sections approximating the outside diameter of the pipe sections whereby thermal expansion of the pipe sections adjacent the sleeve sections during passage of electrical current through the wire closes any clearance space between the sleeve sections and the pipe sections.

2. A fusion weld assembly according to claim 1 wherein the sleeve sections are partially fused to the adjacent surfaces defining the recesses.

3. A fusion weld assembly according to claim 1 and including a pair of radially directed collar openings in the collar adjacent the free ends of the sleeve sections, respectively, and further including a pair of terminals axially extending through the collar openings, respectively, and electrically connected to the free ends, each terminal including an axially serrated base fused with the interior surfaces of the collar openings.

4. A fusion weld assembly according to claim 3 including collar wire openings communicating with the collar openings, respectively, the terminals each include a central passage, and the free ends of the sleeve sections extend radially outwardly through the wire openings and each into the central passageway of one of said terminals, respectively, and including fusible material electrically joining the free ends to the outer extremities of the terminals.

5. In combination, a pair of pipe sections having the same exterior diameter and ends abutting generally along a transverse abutment plane; and a fusion weld assembly for forming a fusion welded joint between the pipe sections, the fusion weld assembly comprising:
an elongated annular collar made of thermoplastic material and having an interior diameter closely approximating the exterior diameter of the pipe sections to closely coaxially receive the pipe sections in close-fitting, end abutting relation along a transverse abutment plane, the collar including a pair of internal annular recesses longitudinally spaced apart on opposite sides of the abutment plane to define an internal thermal barrier land, each of the recesses having the same interior diameter; and
a welding sleeve including a pair of annular sleeve sections disposed in the pair of recesses, respectively, each sleeve section having a plurality of turns of electrical resistance wire sheathed in thermoplastic material and further having an outside diameter approximating the diameter of the recesses, the thermoplastic material of the welding sleeve, the collar and the pipe sections being fusible at their interfaces at a predetermined melting temperature upon passage of electrical current through the wire whereby the collar and the pipe sections are bonded together, the presence of the thermal barrier land preventing fusing of the abutting ends of the pipe sections, the interior diameter of the sleeve sections approximating the outside diameter of the pipe sections whereby thermal expansion of the pipe sections adjacent the sleeve sections during passage of electrical current through the wire closes any clearance space between the sleeve sections and the pipe sections.

6. A method for forming a fusion welded joint between a pair of pipe sections having the same exterior diameter and made of thermoplastic material, the method comprising the steps of:
extruding an elongated cylindrical collar out of thermoplastic material;
heat treating the collar to relieve internal stresses;
machining the collar to provide an interior diameter approximating the exterior diameter of the pipe sections for coaxially receiving the pipe sections in close fitting relationship;
providing a pair of internal annular recesses in the collar in a longitudinally spaced apart relation to define an internal thermal barrier land between the recesses;
forming a welding sleeve including a pair of annular sleeve sections which each have a plurality of turns of electrical resistance wire sheathed in thermoplastic material terminating in a free end and which are electrically connected together, and which each further has an outside diameter approximating the diameter of the recesses and an interior diameter approximating the interior diameter of the collar;
fitting the annular sleeve sections in the pair of recesses, respectively;
inserting the pipe sections in the collar with the ends of the pipe sections abutting generally along a transverse abutment plane passing approximately through the middle of the thermal barrier land; and
applying electrical current to the free ends of the wire until the thermoplastic material of the collar and pipe sections expands at their interfaces to close any clearance therebetween, and continuing until the material at the interfaces melts and thermally expands to develop pressure in the recesses and bonds the collar and pipe sections together, the presence of the thermal barrier land preventing fusing of the abutting ends of the pipe sections.

7. A method according to claim 6 and including after the fitting step the step of inserting in the collar a cylindrical mandrel having an exterior diameter approximating the interior diameter of the collar and the sleeve sections, and heating the welding sleeve to heat the mandrel to fuse and fix the sleeve sections in the pair of recesses, and withdrawing the mandrel from the collar.

8. A method according to claim 6 and including prior to the fitting step the step of forming a pair of radially directed terminal openings in the collar radially outwardly of one of the recesses; disposing a pair of heated terminals having central passages in the terminal openings, respectively; and heating the terminals to fuse them to the collar.

9. A method according to claim 8 and including the step of drilling wire openings in the collar through the terminal passages; passing thermocouple wires through the terminals and the wire openings; and joining the thermocouple wires and arranging them flush with the bases of the recesses.

10. A method according to claim 9 including the step of cutting off the thermocouple wires at the outer ends of the terminals and soldering them to the terminals.

11. A method according to claim 8 and repeating the forming, disposing and heating steps to provide another pair of terminals located adjacent the free ends of the turns of the welding sleeve for electrical connection thereto.

* * * * *